(12) United States Patent
Bastiyali

(10) Patent No.: US 12,526,363 B2
(45) Date of Patent: Jan. 13, 2026

(54) SYSTEM FOR ENSURING SAFE DRIVING

(71) Applicant: Smartsafe Console, LLC, Las Vegas, NV (US)

(72) Inventor: Tarkan Bastiyali, New York, NY (US)

(73) Assignee: SMARTSAFE CONSOLE, LLC, Las Vegas, NV (US)

( * ) Notice: Subject to any disclaimer, the term of this patent is extended or adjusted under 35 U.S.C. 154(b) by 0 days.

(21) Appl. No.: 18/744,173

(22) Filed: Jun. 14, 2024

(65) Prior Publication Data

US 2025/0247463 A1      Jul. 31, 2025

Related U.S. Application Data

(63) Continuation-in-part of application No. 18/425,425, filed on Jan. 29, 2024, now Pat. No. 12,170,740.

(51) Int. Cl.
| | |
|---|---|
| *H04M 1/00* | (2006.01) |
| *B60R 11/02* | (2006.01) |
| *H04M 1/72463* | (2021.01) |
| *B60R 11/00* | (2006.01) |

(52) U.S. Cl.
CPC ......... *H04M 1/72463* (2021.01); *B60R 11/02* (2013.01); *B60R 2011/0075* (2013.01)

(58) Field of Classification Search
CPC ............... H04M 1/72463; B60R 11/02; B60R 2011/0075
See application file for complete search history.

(56) References Cited

U.S. PATENT DOCUMENTS

| | | | | |
|---|---|---|---|---|
| 10,440,633 B1 * | 10/2019 | Bastiyali | ................. | H04W 4/48 |
| 2016/0050309 A1 | 2/2016 | Gooberman | | |
| 2019/0158652 A1 | 5/2019 | Isgar | | |
| 2025/0018887 A1 * | 1/2025 | Rogers | ................ | H02J 7/00032 |

FOREIGN PATENT DOCUMENTS

KR      20140126126 A      10/2014

* cited by examiner

*Primary Examiner* — Ping Y Hsieh
(74) *Attorney, Agent, or Firm* — Hsuanyeh Law Group PC

(57) ABSTRACT

A device housing system contained within a vehicle is provided herein, the device housing system including a front surface, a back surface, a first side member, a second side member, a top member, a bottom member, and a control module configured to communicate with a motion detection mechanism of the vehicle and with an internet-enabled device. The front surface, the first side member, the second side member, and the bottom member define a placement slot for the internet-enabled device, the placement slot being configured to support the internet-enabled device. The device housing system prevents a user from operating an internet-enabled device when the vehicle is in motion, and thus, limits distracted driving. Accordingly, the device housing system increases passenger and vehicle safety.

8 Claims, 13 Drawing Sheets

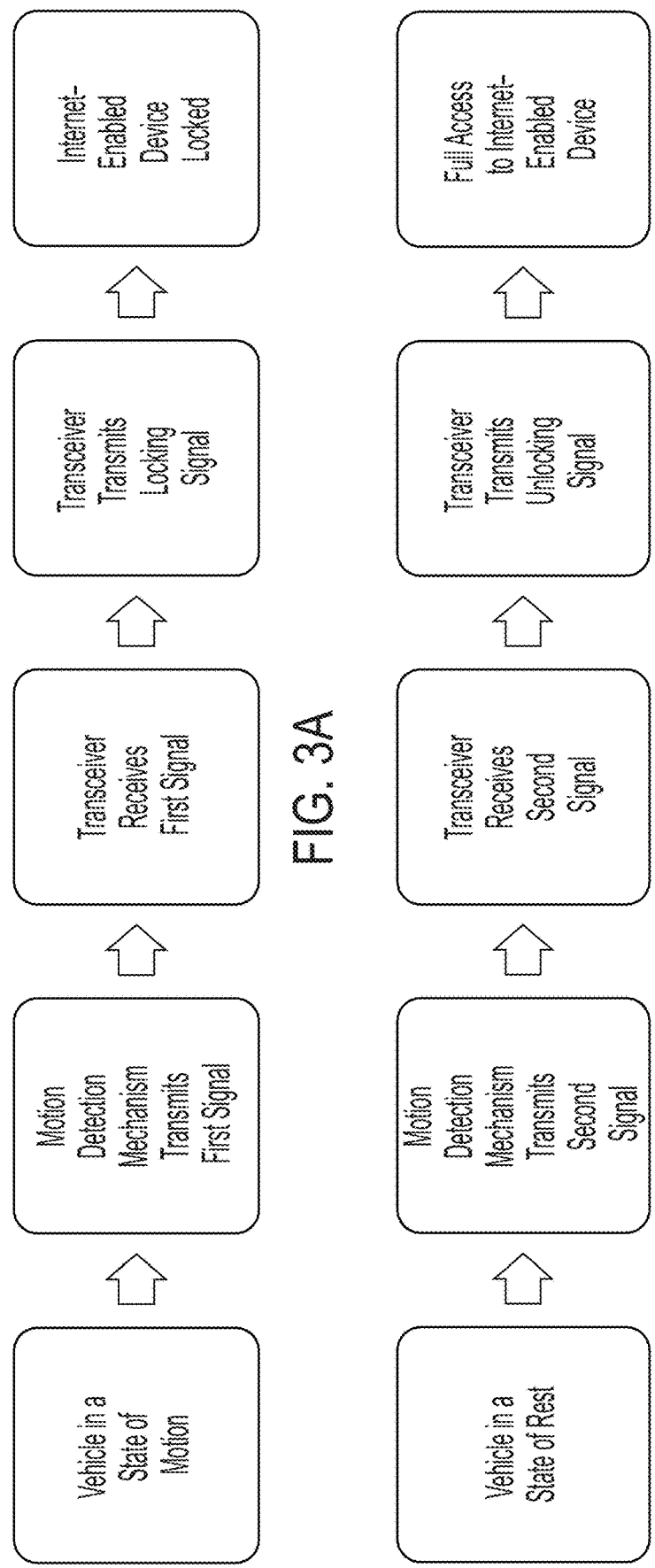

SYSTEM FOR ENSURING SAFE DRIVING

CLAIM OF PRIORITY

This application is a continuation-in-part of U.S. patent application Ser. No. 18/425,425, entitled "SYSTEM FOR ENSURING SAFE DRIVING", filed on Jan. 29, 2024, the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to the fields of vehicle safety and electronic devices. More specifically, the present disclosure relates to electronic device housing systems that assist with safe driving.

BACKGROUND

Many vehicle accidents are caused by distracted drivers using electronic devices while driving. Most current device housing systems act as only temporary placeholders for internet-enabled devices, fail to disable electronic devices placed thereon, and do not change the state of the internet-enabled electronic device depending on the state of a vehicle's motion. Therefore, a need exists for a device housing system which renders an internet-enabled device placed thereon inoperable when a vehicle attached to the device housing system is in motion.

SUMMARY OF THE INVENTION

The present disclosure provides a device housing system contained within a vehicle. The device housing system includes a front surface, a back surface, and a first side member, having a first upper end and a first lower end. In some embodiments, the first side member extends between the back surface and the front surface. Embodiments may contain a second side member, where this second side member has a second upper end and a second lower end, and extends between the back surface and the front surface. Embodiments may also contain a top member which extends between the back surface and the front surface, and is connected to the first upper end and the second upper end. In some embodiments, the device housing system includes a bottom member which extends between the back surface and the front surface, and is connected to the first lower end and the second lower end. Embodiments may also include a control module configured to communicate with a motion detection mechanism of the vehicle and with an internet-enabled device. The front surface, the first side member, the second side member, and the bottom member define a placement slot for the internet-enabled device, the placement slot being configured to support the internet-enabled device.

The present disclosure also provides for a method for preventing access to an electronic device while operating a vehicle, which can begin by first providing a device housing system contained within a vehicle comprising, a front surface, a back surface, a first side member, having a first upper end and a first lower end, the first side member extending between the back surface and the front surface, a second side member, having a second upper end and a second lower end, the second side member extending between the back surface and the front surface, a top member, extending between the back surface and the front surface, and connected to the first upper end and the second upper end, a bottom member, extending between the back surface and the front surface, and connected to the first lower end and the second lower end, and a control module configured to communicate with a motion detection mechanism of the vehicle and with an internet-enabled device, where the front surface, the first side member, the second side member, and the bottom member define a placement slot for the internet-enabled device, the placement slot being configured to support the internet-enabled device, and where the device housing system is configured to actuate the device housing system between a first position whereby physical access to the internet-enabled device is restricted and a second position whereby physical access to the internet-enabled device is permitted.

The method in accordance with the present disclosure can then proceed to the step of registering, by the user, the electronic device with the device housing system such that the electronic device and the device housing system are in wireless electronic communication and then proceeds to the step of disposing, by the user, the electronic device within the placement slot. From there, the method in accordance with the present disclosure then involves moving the device housing system into the first position resulting in the user being restricted from physically from accessing the electronic device. Then, said method proceeds to the step of performing, by the user, a verification protocol, which, when properly completed, results in an unlock signal being transmitted from the console system to the vehicle, indicating that the electronic device is secured within the safe body, thereby permitting driving operation of the vehicle, upon receipt of the signal.

In some embodiments, the verification protocol comprises creating, by a remote server in wireless electronic communication with the electronic device, a verification code, delivering the verification code to the electronic device, entering, by the user into a software application on the electronic device, the verification code, verifying, by the software application, and the entered verification code is accurate, transmitting, by the software application via the electronic device, an authorization signal to the device housing system, and pressing the button, by the user, resulting in the device housing system being in the second position.

In other embodiments, the verification protocol comprises creating, by a remote server in wireless electronic communication with the electronic device, a security query, delivering the verification code to the electronic device, entering, by the user into a software application on the electronic device, the security query, responding to the security query, by the user interfacing with the software application, verifying, by the software application that the security query was answered appropriately, transmitting, by the software application via the electronic device, an authorization signal to the device housing system, and pressing the button, by the user, resulting in the device housing system being actuated to the second position. Embodiments exist where the security query is a puzzle or quiz to be solved by the user. In some embodiments, the quiz must be answered audibly and whether or not the user's speech is slurred is assessed.

Embodiments exist where the verification protocol comprises blowing into a breathalyzer incorporated into the device holding system, by the user to provide the user's BAC, determining whether the BAC is under 0.8, transmitting, by the electronic device, an authorization signal to the safe body, and pressing the button, by the user, resulting in the safe body being in an open position. In other embodiments, the verification protocol comprises providing an image capture device in electronic communication with the device housing system, presenting the user with one or more visual stimuli, tracking, by the image capture device, eye movements of the user in relation to the one or more visual stimuli, and assessing, via the software application performing a horizontal gaze nystagmus test, whether the user is impaired. Embodiments also exist where the verification protocol comprises providing an image capture device in electronic communication with the device housing system, presenting the user with one or more visual stimuli, tracking, by the image capture device, eye movements of the user in relation to the one or more visual stimuli, and assessing, via the software application performing a psychomotor visual test, whether the user is impaired.

In some embodiments, the device housing system further includes a first rail extending from the bottom member to the top member along the back surface and a second rail extending from the bottom member to the top member along the back surface. In such embodiments, the first rail and the second rail are configured to actuate the device housing system between a first position and a second position.

In some embodiments, when the device housing system is in the first position, the device housing system is configured to restrict physical access to the internet-enabled device.

In some embodiments, when the device housing system is in the second position, the device housing system is configured to allow for full physical access to the internet-enabled device.

In some embodiments, the control module further includes a transceiver configured to receive a first signal from the motion detection mechanism when the vehicle is in a state of motion and a second signal from the motion detection mechanism when the vehicle is in a state of rest.

In some embodiments, the transceiver is configured to transmit a locking signal to the internet-enabled device disposed on the placement slot when the transceiver receives the first signal. In such embodiments, the locking signal locks the internet-enabled device, thereby preventing access.

In some embodiments, the transceiver is configured to transmit an unlocking signal to the internet-enabled device disposed on the placement slot when the transceiver receives the second signal. In such embodiments, the unlocking signal provides access to the internet-enabled device.

In some embodiments, the device housing system further includes a middle member, located on the placement slot, which defines a first placement sub-slot and a second placement sub-slot, the middle member extending between the top member and the bottom member.

In some embodiments, the middle member is located at a position equidistant from the first side member and the second side member.

In some embodiments, the device housing system further includes a speaker configured to audibly alert a user that the internet-enabled device is disabled.

In some embodiments, the device housing system further includes a digital screen configured to display information to the user.

In some embodiments, the device housing system further includes a charging unit configured to charge at least one internet-enabled device disposed on the placement slot.

In some embodiments, the placement slot further includes a bottom ridge having a member, the member extending from an intersection of the front surface and the bottom member to beyond the front surface. In such embodiments, the bottom ridge is configured to further support the internet-enabled device from below.

In some embodiments, the device housing system further includes an angle defined by an intersection of the front surface and the bottom member, where the angle is in the range of ninety degrees to one hundred eighty degrees. Preferably, the angle is ninety degrees to one hundred thirty degrees. Most preferably, the angle is ninety degrees to one hundred ten degrees.

In some embodiments, the front surface is manufactured from a material configured to limit the movement of the internet-enabled device placed thereon. In such embodiments, the material is constructed out of one from the group consisting of rubber, polyvinyl chloride, thermoplastic elastomer, thermoplastic polyurethane, foam, sponge, cork, adhesive tape, and non-slip tape.

In some embodiments, the device housing system is constructed out of an antipathogen plastic or antipathogen composite.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE DRAWINGS

In the drawings, like elements are depicted by like reference numerals. The drawings are briefly described as follows.

FIGS. 3A and 3B are exemplary schematic views of the flow of communications between a motion detection mechanism, a transceiver, and an internet-enabled device in accordance with the present disclosure, where FIG. 3A illustrates the flow of communications when a vehicle is in motion and FIG. 3B illustrates the flow of communications when a vehicle is at rest.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present disclosure without departing from the scope or spirit of the disclosure.

DETAILED DESCRIPTION

Reference will now be made in detail to each embodiment of the invention in accordance with the present disclosure. Such embodiments are provided by way of explanation of the present disclosure, which is not intended to be limited thereto in any manner whatsoever. In fact, those of ordinary skill in the art may appreciate upon reading the present specification and viewing the present drawings that various modifications and variations can be made thereto.

Embodiments of the present disclosure relate to device housing systems for locking an internet-enabled device when a vehicle is in a state of motion, and more particularly to a device housing system for preventing a user from operating the internet-enabled device when the vehicle is in motion. The device housing system in accordance with the present disclosure is particularly beneficial when the user does not have assistance while operating a vehicle, such as when the user is the sole passenger of the vehicle.

In the following embodiments, the user may be an occupant of a vehicle, and more particularly, the user may be the driver of the vehicle.

FIG. 1, FIG. 2, and FIGS. 4-7 all show one or more embodiments of the device housing system in accordance with the present disclosure.

Figure 1:
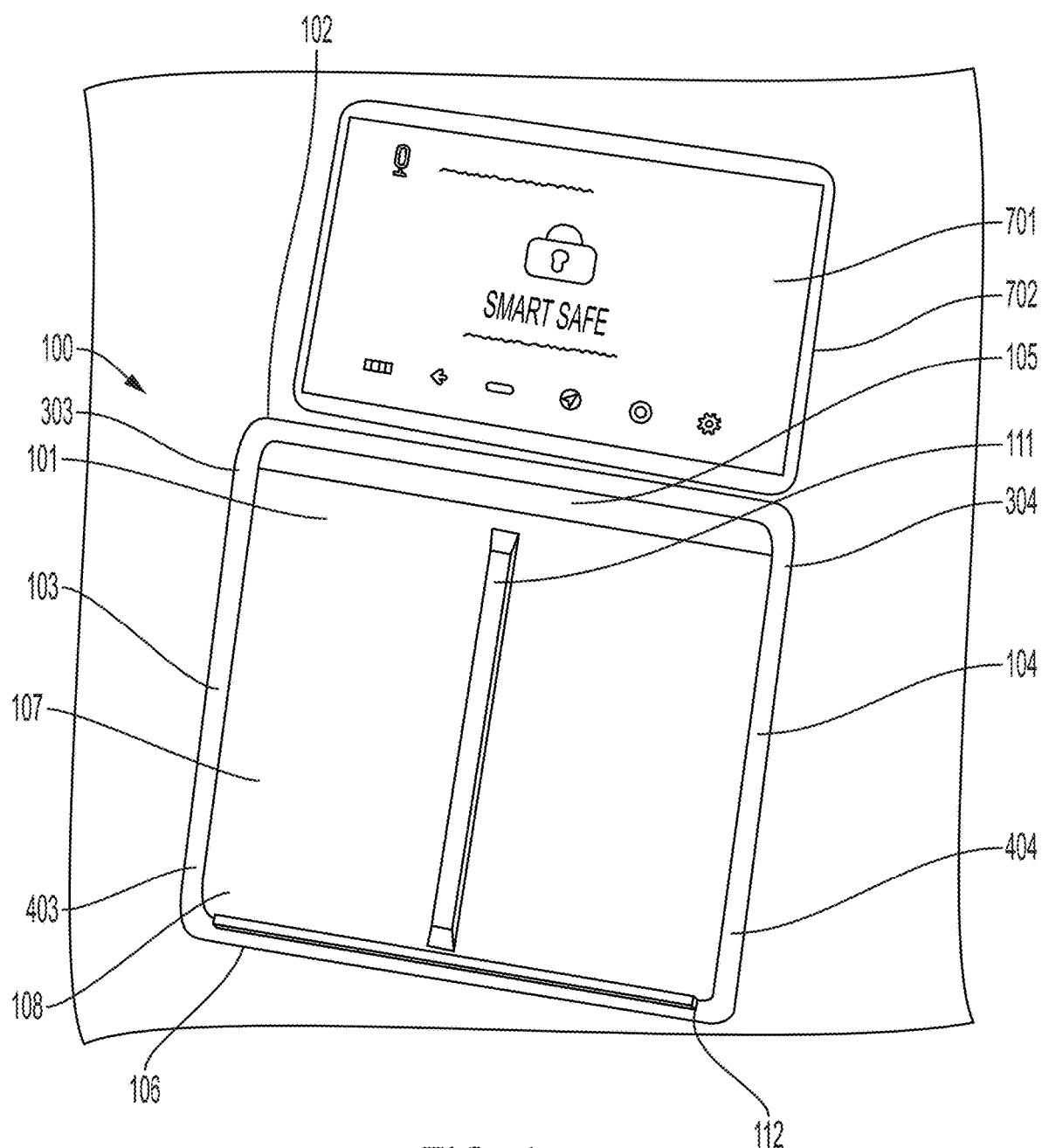
FIG. 1 is a perspective view of a device housing system in accordance with the present disclosure.

As illustrated in FIG. 1, the device housing system 100 includes a front surface 101, a back surface 102, a first side member 103, a second side member 104, a top member 105, and a bottom member 106. The front surface, the first side member, the second side member, and the bottom member define a placement slot 107 for an internet-enabled device 1 (see FIG. 7). The placement slot is configured to support the internet-enabled device placed thereon.

The first side member 103 includes a first upper end 303 and a first lower end 403 and extends between the back surface 102 and the front surface 101. Similarly, the second side member 104 includes a second upper end 304 and a second lower end 404 and extends between the back surface 102 and the front surface 101. In some embodiments, the top member 105 may extend between the back surface 102 and the front surface 101 and is connected to the first upper end 303 and the second upper end 304. Likewise, the bottom member 106 may extend between the back surface 102 and the front surface 101 and is connected to the first lower end 403 and the second lower end 404.

In some embodiments, as further shown in FIG. 1, the device housing system 100 may further include an angle 108 defined by an intersection of the front surface 101 and the bottom member 106. The angle may enable the device housing system to stably support the internet-enabled device 1 on the placement slot 107 via gravity or optionally with the aid of intermolecular forces friction and/or adhesion between the device 1 and the placement slot 107. In some embodiments, the angle is in the range of from ninety degrees to one hundred eighty degrees. Preferably, the angle is in the range of from ninety degrees to one hundred thirty degrees. Even more preferably, the angle is in the range of from ninety to one hundred ten degrees.

Figure 2:
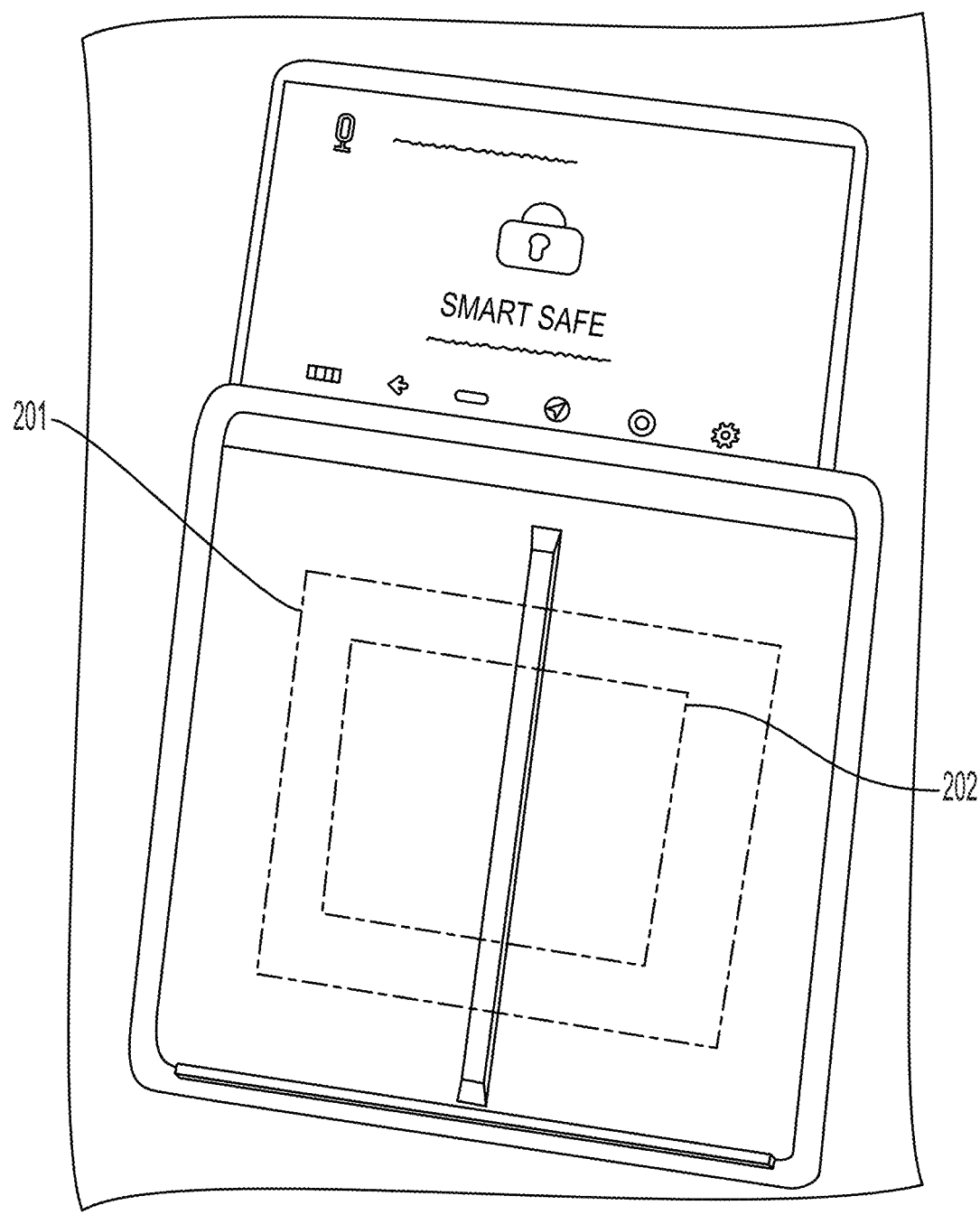
FIG. 2 is an alternative perspective view of the embodiment shown in FIG. 1.

In some embodiments, as illustrated in FIG. 2, the device housing system 100 may further include a control module 201, configured to communicate with the internet-enabled device 1, as well as a motion detection mechanism 10 of the vehicle (not shown in FIG. 2). The internet-enabled device 1 may be a smartphone, a smart watch, or the like.

The motion detection mechanism 10 of the vehicle may include known devices in the art which detect whether the vehicle is in motion. Further, the motion detection mechanism may be a motion detection mechanism provided with the vehicle by the original manufacturer or may be provided by a third-party manufacturer. Accordingly, such flexibility enables the device housing system 100 to be installed in any vehicle, no matter the make or model.

In other embodiments, as further illustrated in FIG. 2, the control module 201 may further include a transceiver 202. The type of transceiver may include any wireless or radio frequency transceiver known in the art. Specifically, the transceiver 202 may be configured to receive a first signal from the motion detection mechanism 10 when the vehicle is in a state of motion. Further, the transceiver may be configured to receive a second signal from the motion detection mechanism when the vehicle is in a state of rest.

The vehicle may be said to be in the state of motion when the motion detection mechanism registers that the vehicle is in motion. For purposes of the present disclosure, even the slightest forward or backward movement of the vehicle may be classified as motion. Alternatively, the vehicle may be said to be in the state of rest when the motion detection mechanism registers no movement of the vehicle.

In some embodiments, the transceiver 202 may be configured to transmit a locking signal to the internet-enabled device 1 disposed on the placement slot 107 when the transceiver receives the first signal. In such embodiments, the locking signal may lock the internet-enabled device. By locking the internet-enabled device, the user may be restricted from fully accessing the internet-enabled device. For example, among others, the user may be denied access to the internet-enabled device's lock screen, home screen, text messaging capabilities, internet capabilities, applications, or any combination thereof.

Similarly, in other embodiments, the transceiver 202 may be configured to transmit an unlocking signal to the internet-enabled device 1 disposed on the placement slot 107 when the transceiver receives the second signal. In such embodiments, the unlocking signal may provide access to the internet-enabled device. When the internet-enabled device is unlocked, the user may be granted full access to the internet-enabled device.

FIG. 3 is an exemplary schematic of the flow of communications between the motion detection mechanism 10, the transceiver 202, and the internet-enabled device 1. FIG. 3A illustrates the flow of communications when the vehicle is in motion. FIG. 3B illustrates the flow of communications when the vehicle is at rest.

In other embodiments, the device housing system 100 may be configured to register the user's internet-enabled device 1. In such embodiments, registering the internet-enabled device to the device housing system may require affirmative steps by the user. In other words, registration of the internet-enabled device may not occur automatically. Accordingly, such a configuration may offer advantages, especially when the vehicle transports individuals that may not be frequent passengers of the vehicle. In other words, the device housing system may preferably be configured to lock only the internet-enabled device of a primary user, e.g., a driver, of the vehicle, not its passengers. Moreover, in other embodiments, the device housing system may be configured to register more than one internet-enabled device. Accordingly, such a configuration may be advantageous when multiple individuals utilize the same vehicle.

In some embodiments, the device housing system may be configured to recognize when the registered internet-enabled device is contained within the vehicle. Specifically, the transceiver 202 may be configured to receive a proximity signal from the registered internet-enabled device 1 when the vehicle is running, and when the registered internet-enabled device is located within the vehicle. Specifically, the transceiver may be configured to receive the proximity signal from the registered internet-enabled device when the registered internet-enabled device is located within e.g., twenty, fifteen, ten, etc., feet of the device housing system 100. In such embodiments, the proximity signal may be any form of electronic communication known in the art.

In some embodiments, the vehicle cannot be placed in motion until the registered internet-enabled device 1, identified to be located within the vehicle by the proximity signal, is disposed on the placement slot 107. In such embodiments, the transceiver 202 may be configured to receive a placement signal from the registered internet-enabled device when the internet-enabled device is disposed on the placement slot. Further, the transceiver may be configured to transmit a motion-enabling signal to the vehicle when the transceiver receives the placement signal. In such embodiments, the motion-enabling signal may enable the vehicle to be placed in motion. For example, the vehicle can be placed in drive, reverse, or neutral.

In a case where two or more internet-enabled devices registered to different users are simultaneously located within the vehicle, one of the users may be required to select the internet-enabled device of the driver on the digital screen 701. Accordingly, in such an event, the vehicle cannot be placed in motion until the registered internet-enabled device of the driver is disposed on the placement slot. Alternatively, in a case where two or more registered internet-enabled devices to the same user are simultaneously located within the vehicle, the vehicle cannot be placed in motion until both the registered internet-enabled devices are disposed on the placement slot.

Figure 4A:
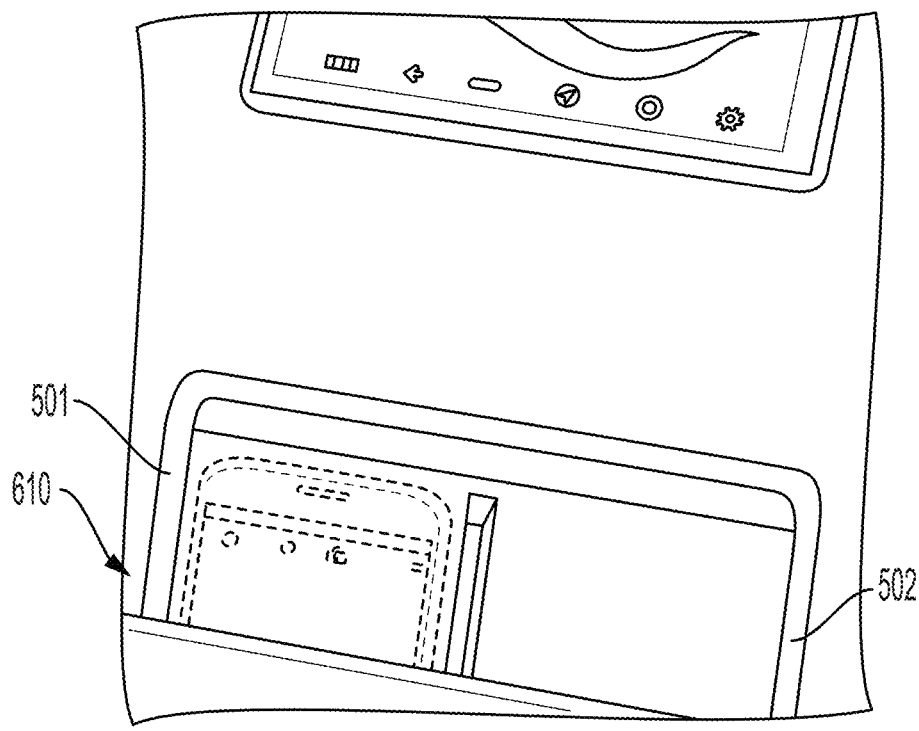
FIGS. 4A and 4B are perspective views of the embodiment of FIG. 1, shown in both a first position and a second position, respectively.
Figure 4B:
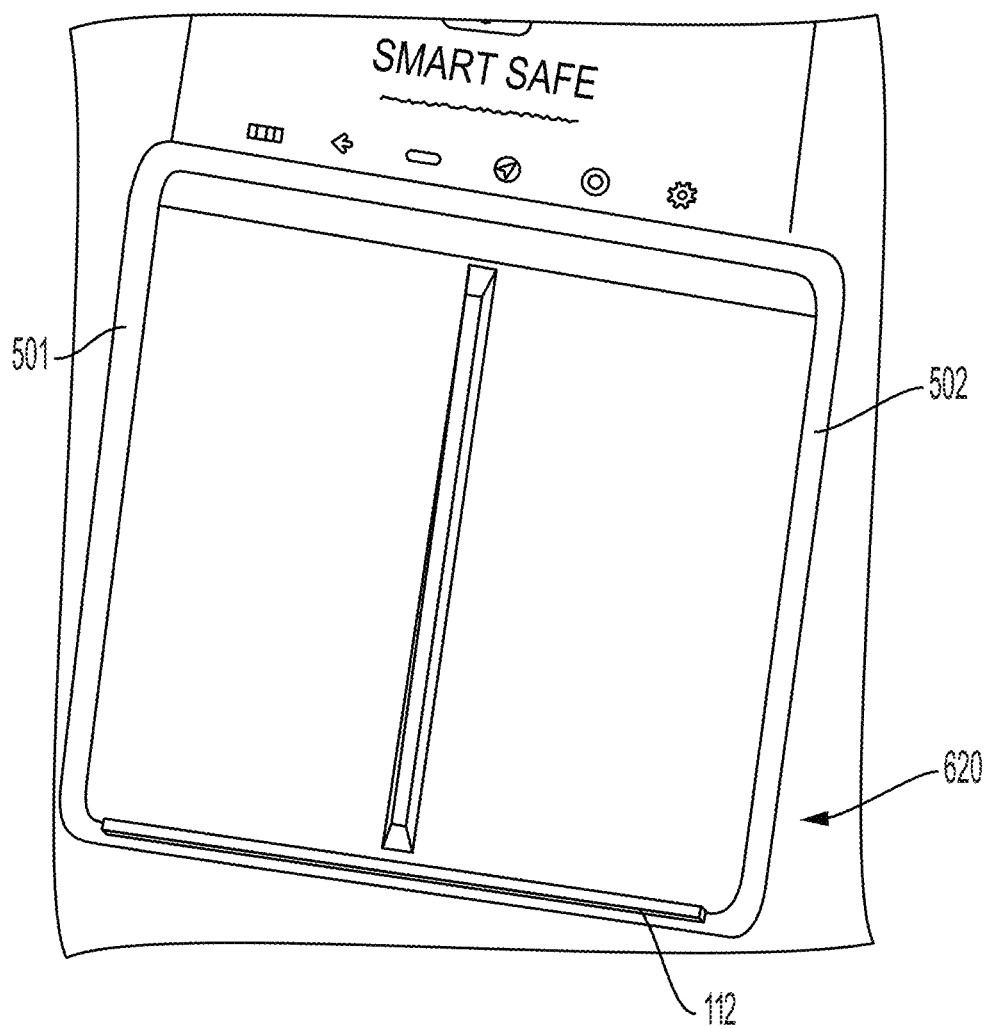

In some embodiments, as shown in FIG. 4, a first rail 501 may extend from the bottom member 106 to the top member 105 along the back surface 102. Further, in other embodiments, a second rail 502 may similarly extend from the bottom member to the top member along the back surface. In some embodiments, the first rail and the second rail are configured to actuate the device housing system 100 between a first position 610 and a second position 620, whereby access to the electronic device 1 is partially restricted when the device housing system 100 is in the first position 610, further incentivizing safe operation of the vehicle. In some embodiments, this actuation may be done along a plane parallel to the back surface 102.

The mechanism by which the first rail and the second rail actuate the device housing system may utilize any form of rails known in the art. For example, among others, the first rail and the second rail may utilize ball bearings or roller bearings. Additionally, in such embodiments, the first rail and the second rail may be manually actuated by the user. Embodiments exists where this actuation is achieved through use of a motor.

In some embodiments, the first rail 501 and the second rail 502 may extend for an entire length between the top member 105 and the bottom member 106. Alternatively, the first rail and the second rail may not extend the entire length between the top member and the bottom member and may extend only partially between the top member and the bottom member. Preferably, the first rail and the second rail are the same length to ensure that the device housing system 100 is level during actuation.

Similarly, in other embodiments, the device housing system 100 may include just one rail, e.g., the first rail or the second rail, or more than two rails to actuate the device housing system. In such embodiments, the rail or rails, respectively, may similarly be configured to actuate the device housing system between the first position and the second position.

In some embodiments, when the device housing system 100 is in the first position 610, as shown in part (a) of FIG. 4, the user's physical access to the internet-enabled device 1 may be restricted. Accordingly, such a configuration may make it more difficult for the user to physically reach the internet-enabled device. Therefore, most preferably, the user will actuate the device housing mechanism to the first position 610 when the vehicle is in motion, to facilitate better visibility of the vehicle's internal controls, and/or to temper the user's inclination to reach for the internet-enabled device.

Alternatively, in other embodiments, when the device housing system 100 is in the second position 620, as shown in part (b) of FIG. 4, the user may have full physical access to the internet-enabled device 1. Accordingly, such a configuration may provide no obstacles for the user to physically reach the internet-enabled device. Thus, most preferably, the user will actuate the device housing mechanism to the second position 620 when the vehicle is at rest.

Figure 5A:
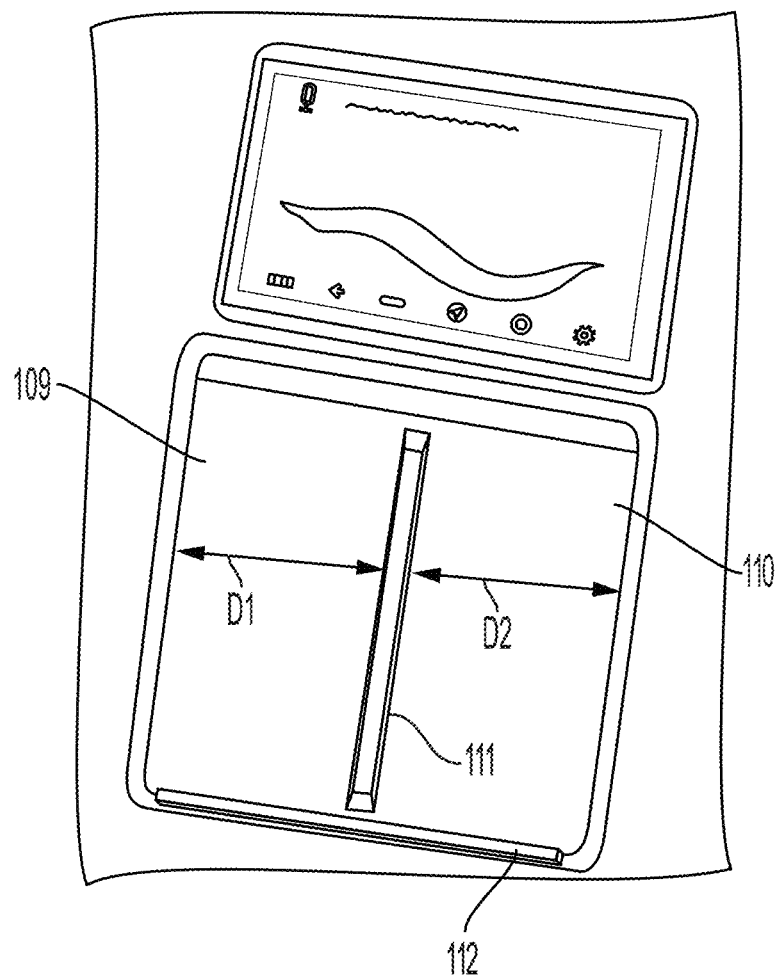
FIG. 5A is a perspective view of an alternative embodiment of the device housing system in accordance with the present disclosure.
Figure 5B:
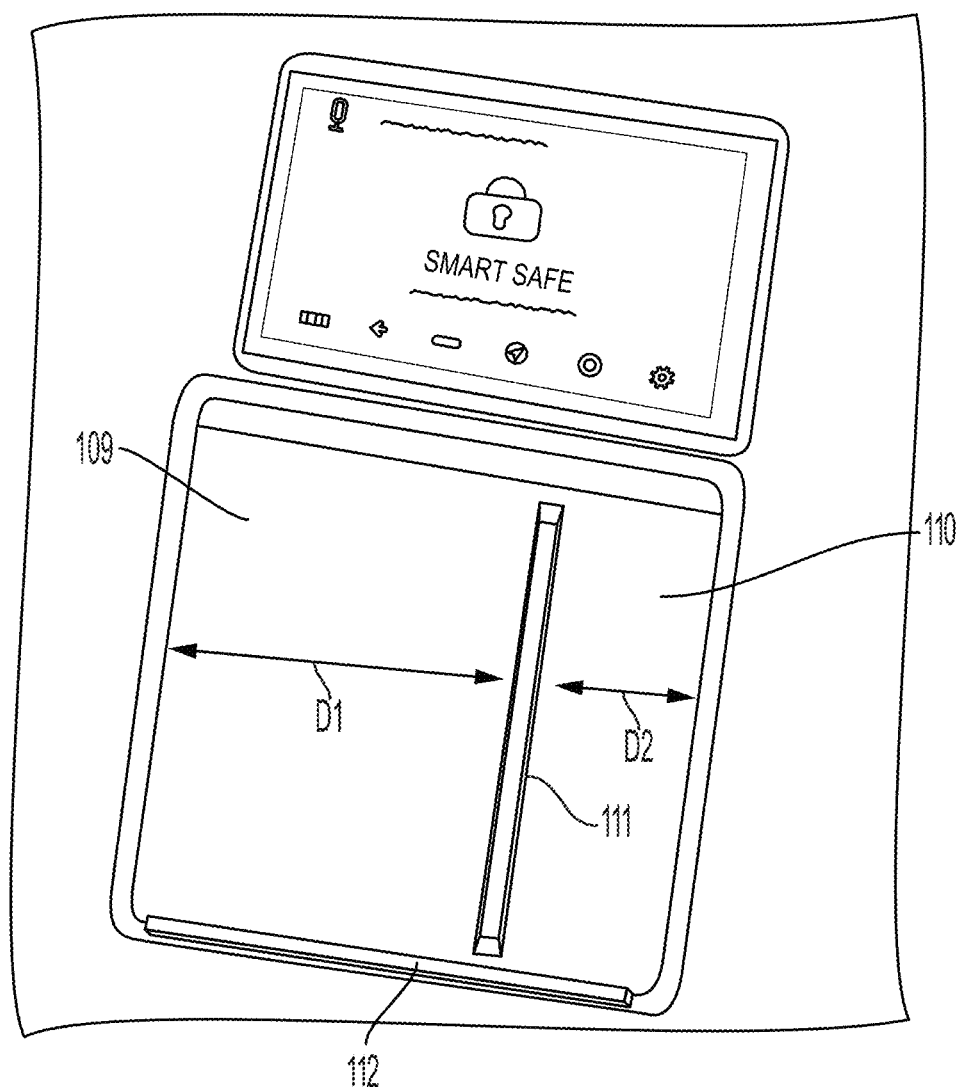
FIG. 5B is a perspective view of an alternative embodiment of the device housing system in accordance with the present disclosure.

In some embodiments, as shown in FIG. 5, the device housing system 100 may further include a middle member 111 located on the placement slot 107. In such embodiments, the middle member may extend between the top member 105 and the bottom member 106. Further, the middle member may extend in any direction on the placement slot 107. Preferably, the middle member 111 may extend in a direction parallel to the planes of the first side member 103 and the second side member 104 so as to maximize an area of the placement slot 107 configured to support the internet-enabled device 1.

In other embodiments, the middle member may extend for an entire length between the top member and the bottom member. Alternatively, in some embodiments, the middle member may not extend the entire length between the top member and the bottom member and may extend only partially between the top member and the bottom member.

In some embodiments, as also shown in FIG. 5, the middle member 111 may define a first placement sub-slot 109 and a second placement sub-slot 110. The first placement sub-slot may be further defined by a width, D1, which is a distance between the first side member 103 and the middle member. Similarly, the second placement sub-slot may be further defined by a width, D2, which is a distance between the second side member 104 and the middle member. In such embodiments, the first placement sub-slot 109 and the second placement sub-slot 110 may each be configured to hold at least one internet-enabled device 1.

In some embodiments, as shown in part (a) of FIG. 5, the middle member 111 may be located at a position equidistant from the first side member 103 and the second side member 104. In such embodiments, the width of the first placement sub-slot 109 and the width of the second placement sub-slot 110, that is, D1 and D2, respectively, are equal. Accordingly, such a configuration may allow for at least two larger internet-enabled devices, such as smartphones, to be comfortably placed on the first placement sub-slot and second placement sub-slot. Further, such a configuration may be considered for aesthetic reasons.

In some embodiments, as shown in part (b) of FIG. 5, the middle member 111 may not located at a position equidistant from the first side member 103 and the second side member 104. In such embodiments, the width of the first placement sub-slot 109 and the width of the second placement sub-slot 110, that is, D1 and D2, respectively, are not equal. Accordingly, such a configuration may allow for at least two internet-enabled devices of varying sizes, e.g., smartphone, smart watch, etc., to be comfortably placed on the first placement sub-slot and the second placement sub-slot.

In other embodiments, the device housing system 100 may contain more than one middle member 111, and thus, more than two placement sub-slots. Accordingly, such a configuration may allow for at least three internet-enabled devices to be comfortably placed on the placement slot 107.

Figure 6:
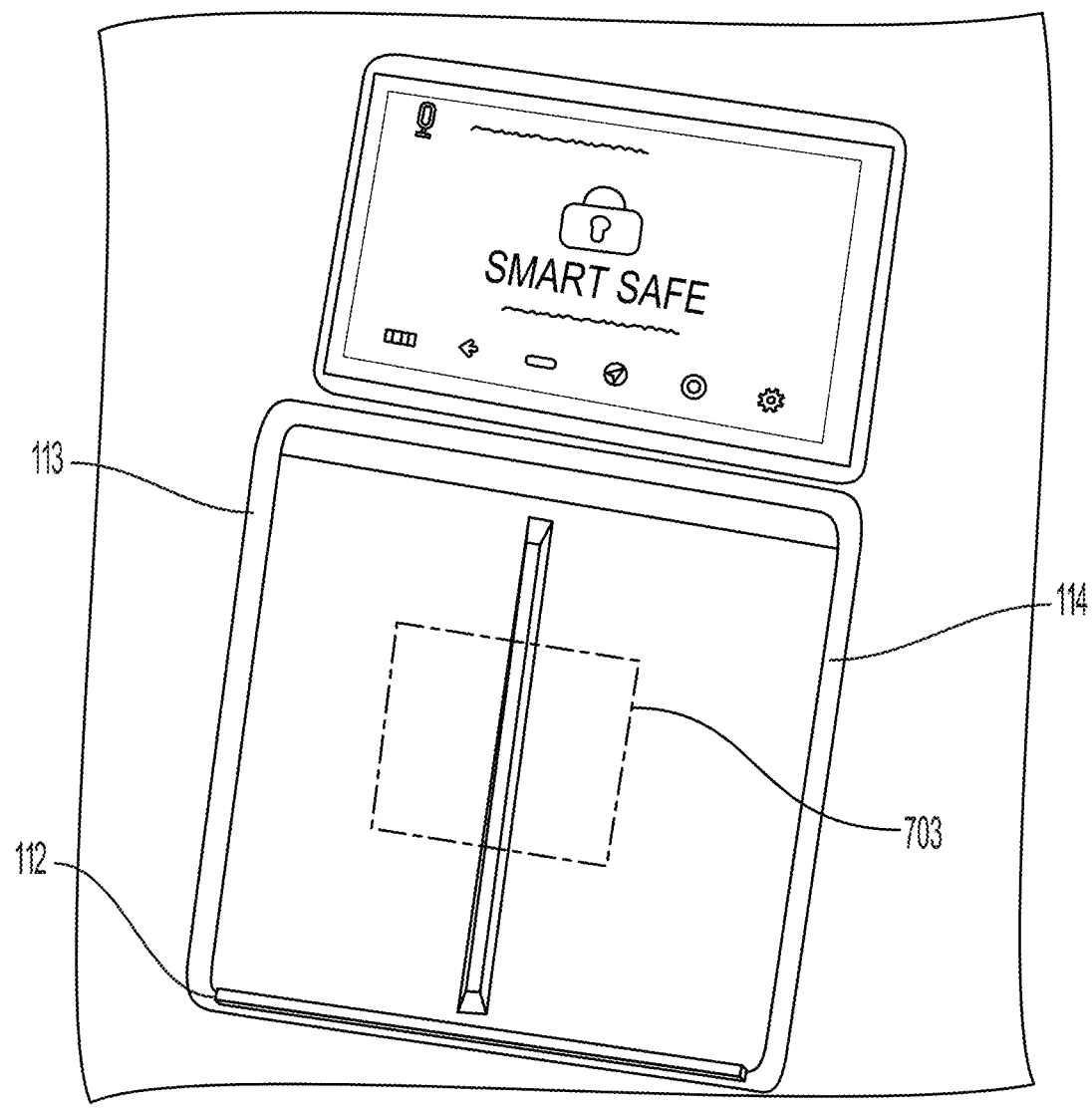
FIG. 6 is a perspective view of another embodiment of the device housing system in accordance with the present disclosure.

In some embodiments, as shown in FIG. 6, the placement slot 107 may further include a bottom ridge 112. The bottom ridge may have a member which extends from an intersection of the front surface 101 and the bottom member 106 to a point beyond the front surface. The bottom ridge may be configured to support the internet-enabled device 1 from below. In such embodiments, a length of the member which extends beyond the front surface may be of a length sufficient to further support at least one internet-enabled device from below.

In some embodiments, as shown in FIG. 6, the placement slot 107 may further include a first side ridge 113 having a first ridge member. The first ridge member may extend from an intersection of the front surface 101 and the first side member 103 to a point beyond the front surface. The first side ridge may be configured to further support the internet-enabled device 1 from the left. In such embodiments, a length of the first ridge member which extends beyond the front surface may be of a length sufficient to further support at least one internet-enabled device from the left. Similarly, in some embodiments, as shown in FIG. 6, the placement slot 107 may further include a second side ridge 114 having a second ridge member. The second ridge member may extend from an intersection of the front surface and the second side member to a point beyond the front surface. The second side ridge may be configured to further support the internet-enabled device 1 from the right. In such embodiments, the length of the second ridge member which extends beyond the front surface may be of a length sufficient to further support at least one internet-enabled device from the right. In other embodiments, a plane of the first side ridge 113 and a plane of the second side ridge 114 may be substantially parallel to one another.

In other embodiments, as further shown in FIG. 6, the device housing system 100 may include a charging unit 703. The type of charging unit may be any charging unit known in the art, although preferably is a charging unit configured to wirelessly charge an electronic device 1 disposed on the device housing system 100. In such embodiments, the charging unit may be configured to charge at least one internet-enabled device 1 disposed on the placement slot 107. Further, the charging unit may be configured to charge various classifications of internet-enabled devices at once, including, but not limited to, smartphones, smartwatches, and the like.

Figure 7:
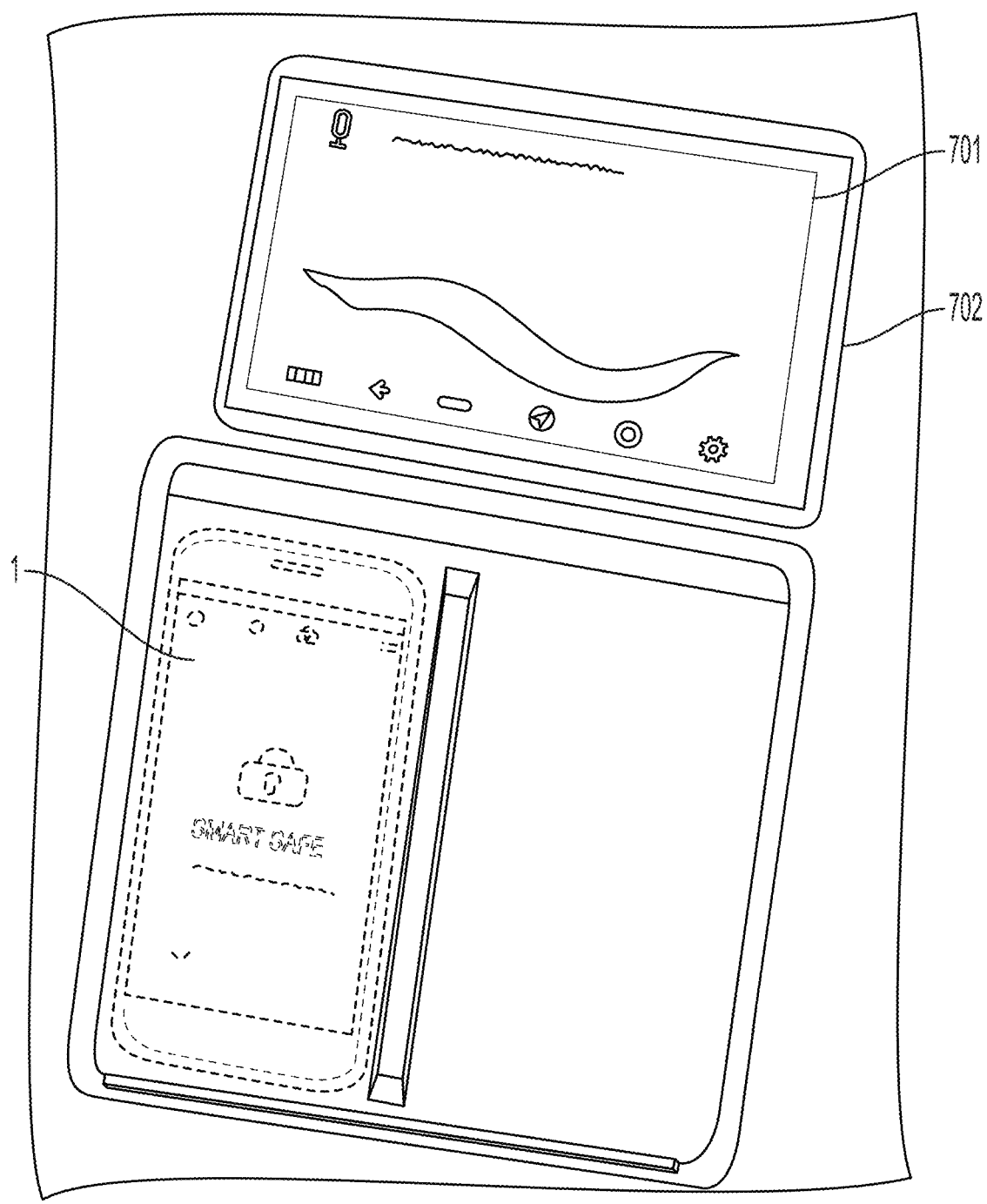
FIG. 7 is a perspective view of the embodiment of FIG. 1, highlighting the placement of an electronic device thereon.

In some embodiments, as shown in FIG. 7, the device housing system 100 may further include a digital screen 701 configured to display information to the user. The information displayed to the user may relate to the operational status of the internet-enabled device 1 or the vehicle. For example, the information displayed to the user may relate to whether the internet-enabled device is disabled, but the information displayed to the user is not limited thereto. Moreover, in such embodiments, the digital screen may be configured to be touch screen.

In some embodiments, as shown in FIG. 7, the device housing system 100 may further include a speaker 702 configured to audibly alert the user that the internet-enabled device 1 is disabled. The audial information emitted to the user may relate to the operational status of the internet-enabled device or the vehicle. For example, the information emitted to the user may relate to whether the internet-enabled device is disabled, but the information emitted to the user is not limited thereto.

In some embodiments, the speaker 702 may be located anywhere on the device housing system 100. Preferably, the speaker may be located on the back surface 102. More preferably, the speaker may be located behind the digital screen 701 so as to emit substantially unmuffled audial information to the user.

In some embodiments, the front surface 101 may be manufactured from a material configured to limit the movement of the internet-enabled device 1 placed thereon. The material used on the front surface 101 may include material known in the art which restricts movement. More specifically, the material may restrict movement of the internet-enabled device placed on the device housing system 100 via intermolecular forces, e.g., friction and/or adhesion between the internet-enabled electronic device 1 and the device housing system 100. For example, the material of the front surface may be constructed out of one or more of either rubber, polyvinyl chloride, thermoplastic elastomer, thermoplastic polyurethane, foam, sponge, cork, adhesive tape, or non-slip tape. Accordingly, such configurations may offer advantages, such as limiting and/or preventing movement of the internet-enabled device on or off the front surface.

In some embodiments, the device housing system 100 may be constructed out of an antipathogen plastic or antipathogen composite. In such embodiments, "antipathogen plastic" or "antipathogen composite" may be construed to include plastics or composites, respectively, that have antiviral and/or antimicrobial properties. For example, antiviral plastics or composites may be capable of killing 99.9999% of viruses, such as the SARS-COV-2 virus, on material surfaces in 60 minutes or less. Similarly, antimicrobial plastics or composites may include materials that contain an active ingredient which prevents microbial growth. Accordingly, the device housing system may be constructed out of graphene-thermoplastic polyurethane (G-TPU), silver, copper, linoleum, or any other material with anti-viral and/or anti-microbial properties.

In other embodiments, one or more components of the device housing system 100 may be independently, fully or partially, constructed of a recycled material, a lightweight material, a waterproof material, or a combination thereof.

In some embodiments, the components of the device housing system 100 may be fastened to one another using any fastening means known in the art. For example, the components of the device housing system may be fastened to one another via bolts, nails, latches, clamps, adhesives, or a combination thereof, but the present disclosure is not limited thereto. Furthermore, in such embodiments, the components of the device housing system may be permanently attached to one another so as to maintain the structure and rigidity of the device housing system.

In some embodiments, the device housing system 100 may be permanently attached to the vehicle via bolts, nails, latches, clamps, adhesives, or a combination thereof, but the present disclosure is not limited thereto. Such a configuration may ensure that the device housing system does not detach from the vehicle during normal driving conditions or occurrences. In other embodiments, the device housing system may be removably attached from the vehicle to facilitate ease of replacement and/or repair.

The size, shape, orientation, and configuration of device housing system components are not limited to what is illustrated in the FIGS. 1 to FIG. 2 and FIGS. 4-7. Those skilled in the art will appreciate that any suitable configuration of device housing system components is within the scope of the present disclosure.

In some embodiments, the console system in accordance with the present disclosure can be configured to promote the safe operation of the vehicle in a variety of ways. In various embodiments, said console system can be configured to prevent impaired operation of the vehicle. In other embodiments, the console system in accordance with the present disclosure can be configured to prevent against theft of the vehicle or operation of the vehicle by an unauthorized user. Embodiments also exist where the console system in accordance with the present disclosure is used by on-the-clock workers to both clock their time operating the vehicle as well as to ensure these works do not utilize their electronic device while operating the vehicle.

Figure 8:
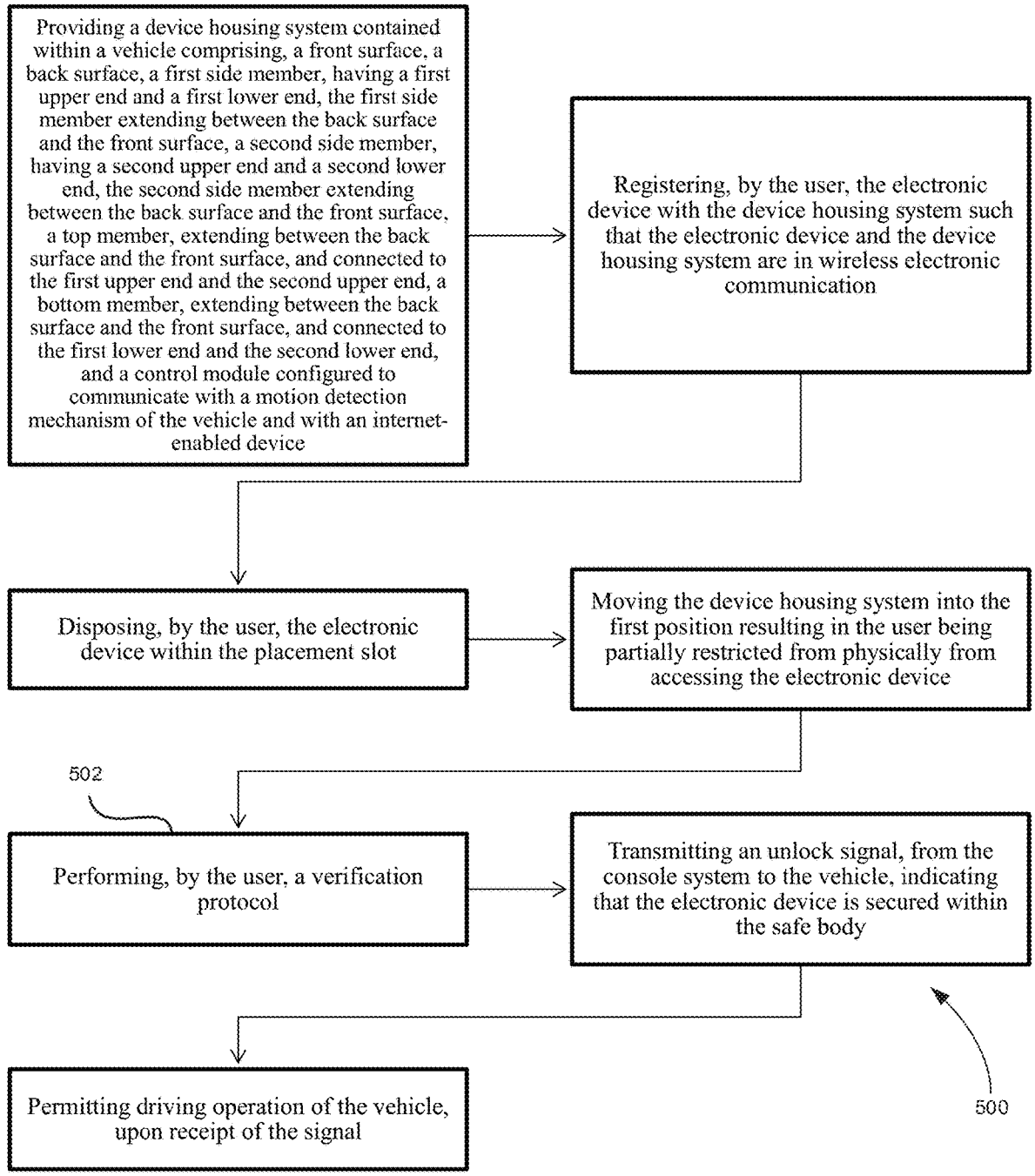
FIG. 8 is a flow chart illustrating a method of ensuring safe driving, according to an embodiment of the present disclosure.

Referring to FIG. 8, an embodiment of the method in accordance with the present disclosure is provided. There, the method beings by providing a device housing system contained within a vehicle comprising, a front surface, a back surface, a first side member, having a first upper end and a first lower end, the first side member extending between the back surface and the front surface, a second side member, having a second upper end and a second lower end, the second side member extending between the back surface and the front surface, a top member, extending between the back surface and the front surface, and connected to the first upper end and the second upper end, a bottom member, extending between the back surface and the front surface, and connected to the first lower end and the second lower end, and a control module configured to communicate with a motion detection mechanism of the vehicle and with an internet-enabled device, where the front surface, the first side member, the second side member, and the bottom member define a placement slot for the internet-enabled device, the placement slot being configured to support the internet-enabled device, and where the device housing system is configured to actuate the device housing system between a first position whereby physical access to the internet-enabled device is restricted and a second position whereby physical access to the internet-enabled device is permitted.

The method then proceeds to the step of registering, by the user, the electronic device with the device housing system such that the electronic device and the device housing system are in wireless electronic communication. Then the step of disposing, by the user, the electronic device within the placement slot is performed. From there, the device housing system is moved into the first position resulting in the user being partially restricted from physically from accessing the electronic device. The user then performed a verification protocol, which when properly completed results in an unlock signal being transmitted from the console system to the vehicle, indicating that the electronic device is secured within the safe body, thereby permitting driving operation of the vehicle, upon receipt of the signal.

Figure 9A:
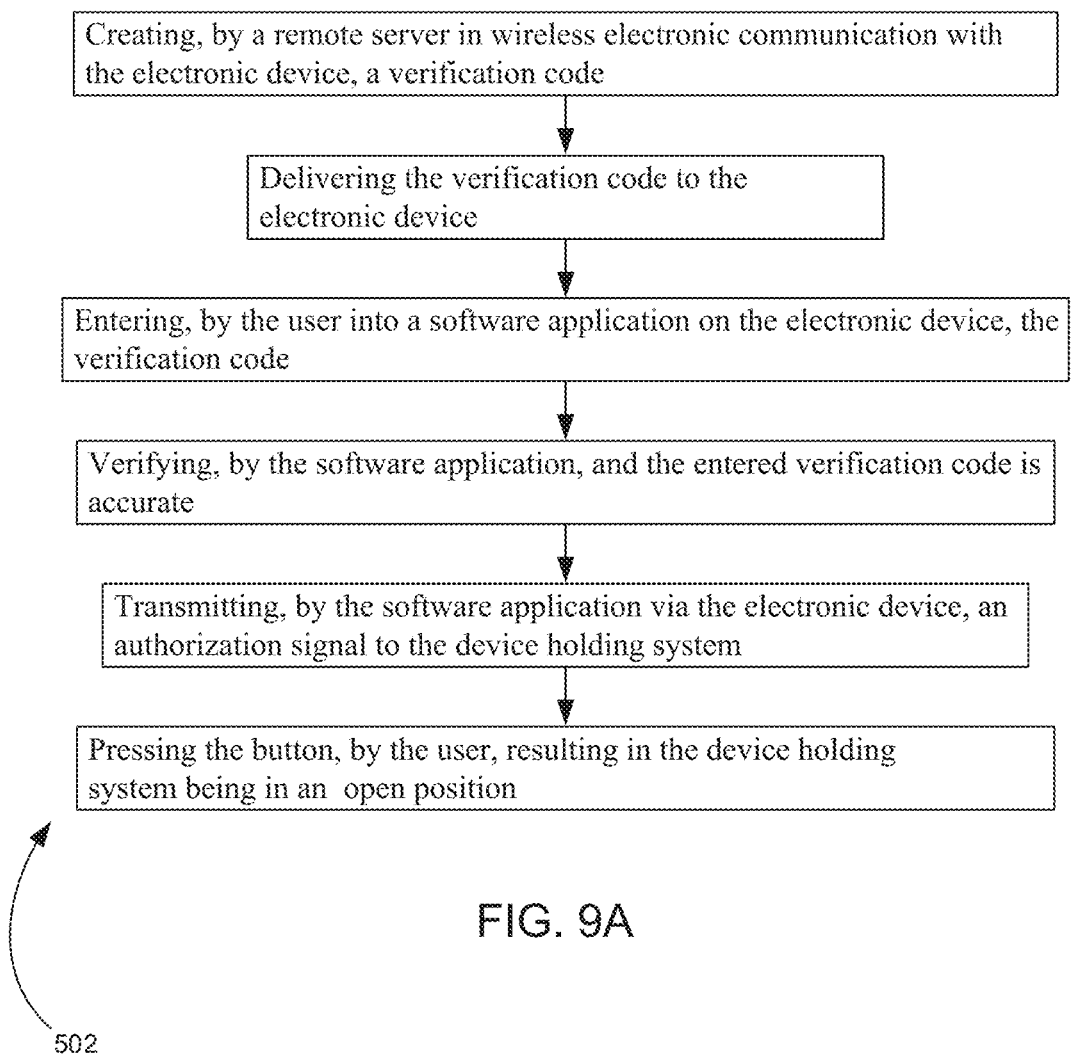
FIG. 9A is a flow chart illustrating steps of a verification protocol, according to an embodiment of the present disclosure.

FIG. 9A shows an embodiment of the method in accordance with the present disclosure where the console system in accordance with the present disclosure is configured to prevent theft or other unauthorized use of the vehicle. There, a user can perform a verification protocol 502 as follows: First, a user presses a button disposed on the safe body. By pressing this button, a distinct code that will be sent to the user's email or phone number linked to a corresponding software application installed on the electronic device. The user then inputs this code into the software application, preferably within an "anti-theft" section of said software application. Once this step is completed and the authenticity of the entered code has been verified, the user can push the button again to move the safe body into an open position and place their electronic device therein. Once the electronic device is within the safe body, the safe body will be moved into the closed position upon which the console system will electronically communicate with the vehicle, permitting operation.

Figure 9B:
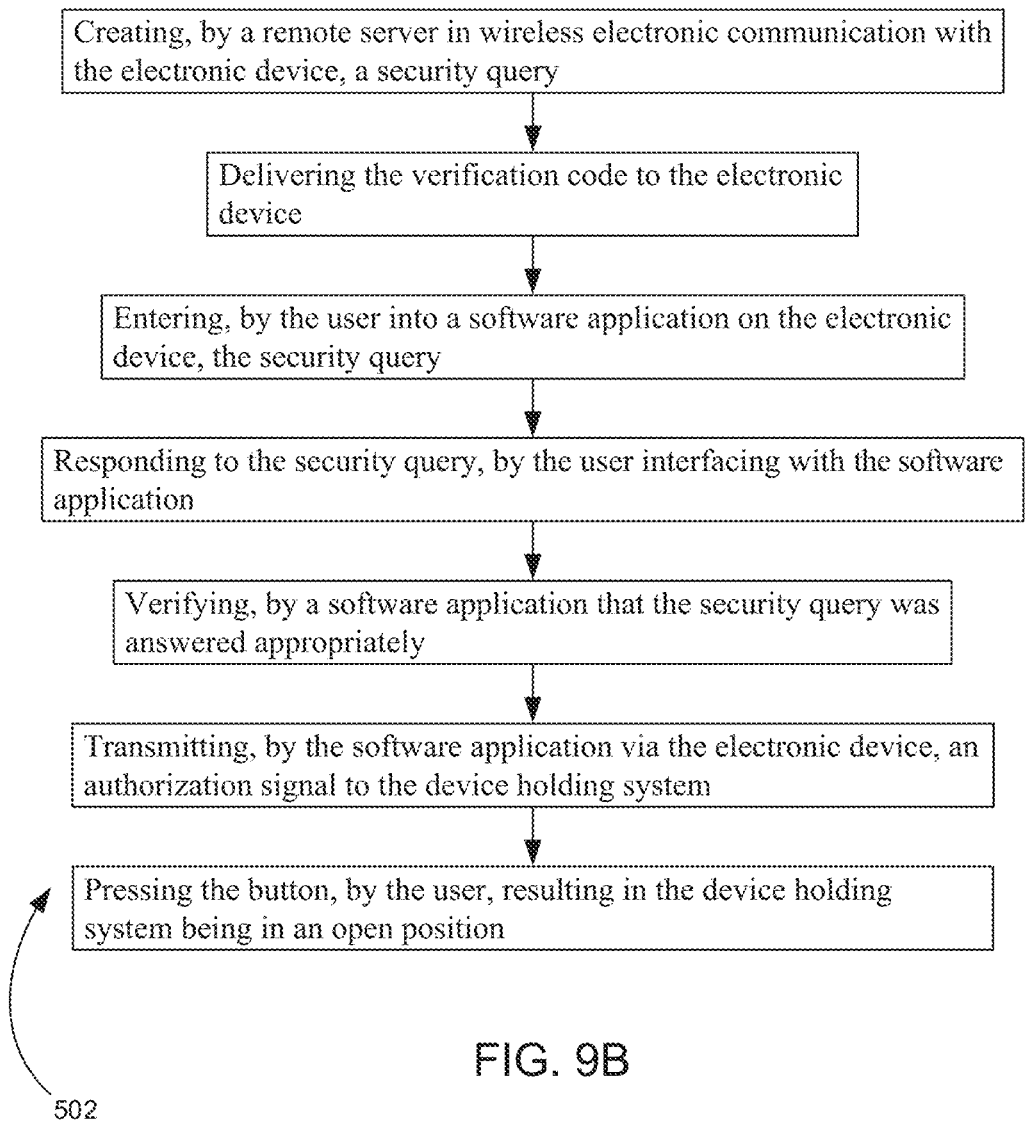
FIG. 9B is a flow chart illustrating steps of a verification protocol, according to an alternate embodiment of the present disclosure.

FIG. 9B shows an embodiment of the method in accordance with the present disclosure where the console system in accordance with the present disclosure is configured to prevent against impaired driving, which includes situations where the user is under the influence of alcohol, drugs, or is merely drowsy. Here, a user can be permitted to operate the vehicle by first pressing the button disposed on the exterior of the safe body. By pressing this button, initiation of a verification protocol on a corresponding software application on the electronic device will occur. Various verification protocols will be outlined below. In some embodiments, users will have 3 attempts to successfully complete the verification protocol. In other embodiments, users will have a single attempt.

Embodiments exist where the verification protocol comprises a puzzle where the user must rearrange digital puzzle pieces or other digital renderings of objects to a proper orientation. In other embodiments, the verification protocol is in the style of a CAPTCHA, whereby a user will be presented with partially obscured characters which must be entered into the software application. In other embodiments, the verification protocol consists of one or more questions which must be answered audibly. In some embodiments, the user will be presented with simple math questions, or will be tasked with listing a series of presented numbers in numerical order. In these embodiments, the software application will be equipped with a means for detecting slurred speech, preferably through the use of artificial intelligence trained on the user's voice. In some embodiments, the software application utilizes built-in voice assistants such as Siri or Alexa.

In other embodiments, users will gain operation of the vehicle by first pressing the button disposed on the exterior of the safe body which will generate a distinct code that will be sent to the user's email or phone number linked to a corresponding software application installed on the electronic device. Upon entering this code into the software application and the codes authenticity if verified, the user will then be presented with the verification protocol as outlined above. Upon completion of this verification protocol, the user will be permitted to place their device within the safe body which will be moved into an open position. Once the electronic device is placed within the safe body, the safe body is moved into the closed position and a signal is transmitted to the vehicle to permit operation.

Figure 9C:
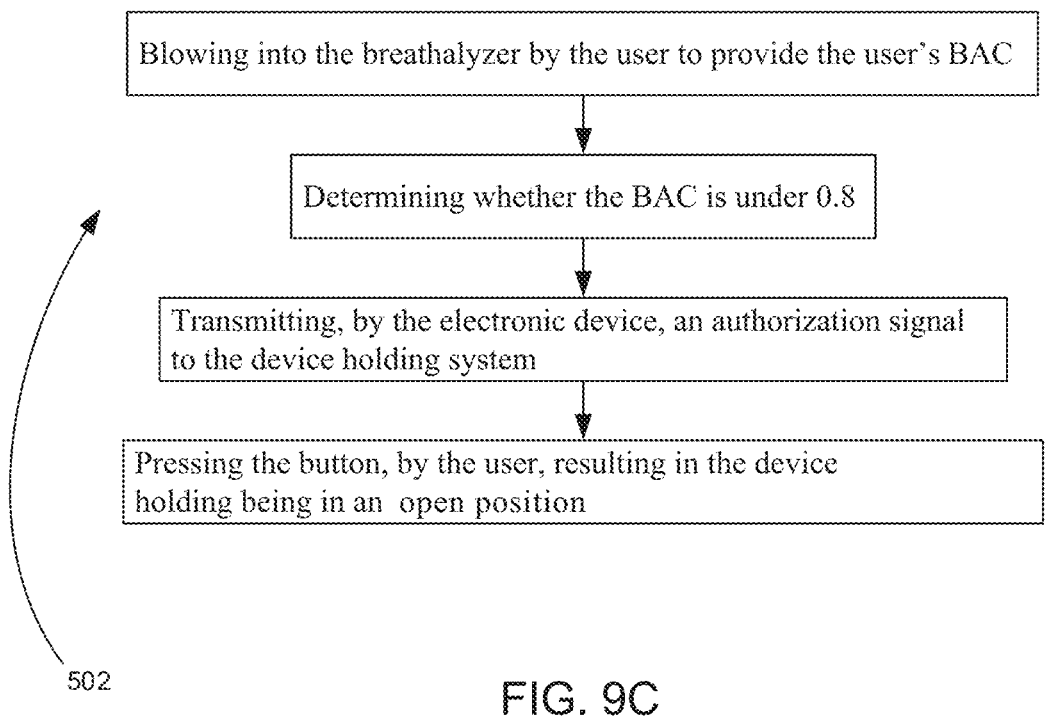
FIG. 9C is a flow chart illustrating steps of a verification protocol, according to another alternate embodiment of the present disclosure.

In some embodiments, the console system in accordance with the present disclosure is equipped with a breathalyzer device. In these embodiments, an embodiment of the verification protocol 502 is shown in FIG. 9C. There, a user must blow into the breathalyzer as part of the verification protocol, and upon verifying that the user's BAC is below the legal limit within the user's jurisdiction, access to the interior of safe body will be permitted. In some embodiments, the console system in accordance with the present disclosure is equipped with a device which can detect the presence of marijuana odor. If detected, said console system will not permit operation of the vehicle. In some embodiments, users will be prompted to complete a Horizontal Gaze Nystagmus (HGN) Test as part of the verification protocol to ensure that the user is not unduly under the influence of alcohol or is experiencing meaningful drowsiness. In these embodiments, a camera feature on the electronic device will be utilized to perform this test. Preferably, a system utilizing artificial intelligence will analyze the user's eye movements to detect any signs of involuntary jerking, which can indicate impairment or drowsiness of the user.

Embodiments also exist where the console system in accordance with the present disclosure includes a punch clock system. In such embodiments, the user may press a button on the safe body to generate a code which will be sent to an email or phone number of the user. The user will then input this code into the designated login area for the punch clock on a software application on the electronic device. Preferably, this punch clock will determine the hours to be paid for driving. In order to start the vehicle, the user can press the button on the safe body console once more to prompt a "yes" input for syncing the electronic device with the console system. Only after completing this step can the user place the phone within the safe body to ultimately gain the ability to operate the vehicle. Embodiments exist where the punch clock contains a start time, an end time, and/or a timer for use by the user to assist with time keeping.

In some embodiments, the user will be required to input an assigned ID number into the software application to ensure that the proper user is credited with the time spent driving. In other embodiments, the user will also have to input their assigned ID number into the software application when they are clocking out. In some embodiments, a digital interface is provided, via a software application installed on the electronic device, where the user may both clock in and clock out of a driving session. In these embodiments, users may also be provided with a shift scheduling interface whereby the user can see any upcoming shifts that they are scheduled for. Other embodiments exist where any overtime that a user may generate is tracked and logged by a software application installed on the electronic device and/or the console in accordance with the present disclosure. Embodiments also exist where any breaks that a user may take are tracked and logged by a software application installed on the electronic device and/or the console in accordance with the present disclosure. Additionally, other embodiments exist where users may request paid-time-off through said software application or may make other requests such as updating the user's personal information, view past pay stubs, or make other human resources-related requests. In some embodiments, said software integration can be configured to provide a user with direct payment for time spent, which can be paid using any standard payment mechanism. In yet other embodiments, said software application can generate one or more reports, showing the user and optionally a third party metrics on the user's interaction with said software application and the console in accordance with the present disclosure. In some embodiments, any upcoming shifts or breaks can be pushed to the user via a notification. Other embodiments exist where said software application integrates with a third-party payroll system.

Embodiments exist where the geolocation of a user is tracked by the console in accordance with the present disclosure and/or the electronic device.

In various embodiments, users of the console system containing a punch clock in accordance with the present disclosure must verify their identity. In some embodiments, a user will be prompted to log into a software application installed on the electronic device. In these embodiments, the user will have the option to log in using an email address, or a user-selected username. In some embodiments the user will provide a password while logging in, while in other embodiments, the user will be provided with a login code by a third party, such as the user's employer. In yet other embodiments, users will be prompted to log in using a PIN such as a 4-digit code. Embodiments exist where biometric data, such as a fingerprint or facial scan, are used to verify the identity of the user such that the proper user can be credited for the time spent driving. In the embodiments where a user is prompted to log in, two-factor authentication is an option that can be used.

In some embodiments, the software application on the electronic device will have a drowsiness section, wherein users are required to successfully complete a Psychomotor Vigilance Test (PVT) prior to starting the vehicle. The PVT is a widely employed tool for assessing an individual's attention and reaction time. In such embodiments, users are tasked with passing a reaction task where they must quickly respond to various visual stimuli, such as lights appearing on the screen. In other embodiments, users will be presented with numbers displayed within in a box, and the user must tap the screen once the numbers appear. Preferably, a system utilizing artificial intelligence will assess the alertness level of the user to determine if they are fit to drive the car.

Embodiments exist where the system in accordance with the present disclosure is equipped with one or more additional cameras. Preferably, these cameras will be integrated with an artificial intelligence system that is configured to detect whether a user is interacting with a second electronic device not secured within the safe body in accordance with the present disclosure. This will assist with preventing users from simply bringing two electronic devices with them and only securing one such device within the safe body in accordance with the present disclosure. In some embodiments, when a second electronic device is detected by these one or more additional cameras while the vehicle is in motion, a third party such as an employer, a fleet manager, or a parent, will have a message sent them to inform them of the presence of this second electronic device. Embodiments exist where a user may register this second electronic device with the system in accordance with the present disclosure to avoid these messages being sent to the third party. Preferably, within 10 minutes of beginning to operate the vehicle the user may pull over to register this second device.

In some embodiments, when the electronic device is removed from the placement slot in accordance with the present disclosure, the user is audibly altered via the vehicles pre-existing seatbelt alarm system. Embodiments exist where when the electronic device is removed from the placement slot that a recording is played to alert the user that it is not safe to use the electronic device while operating the vehicle. In some of these embodiments, an artificial intelligence-based system is used to detect when the electronic device has been removed from the placement slot. In other embodiments when the electronic device is removed from the placement slot, the device housing system sends a signal to the electronic device which disables the electronic device. In these embodiments, when the electronic device is placed within the placement slot and the vehicle is not in operation, a second signal is transmitted to the electronic device which enables said device.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents. Implementations may also include one or a combination of any two or more of the aforementioned features or embodiments.

For purposes of the present disclosure of the invention in accordance with the present disclosure, unless specifically disclaimed, the singular includes the plural and vice-versa, the words "and" and "or" shall be both conjunctive and disjunctive, the words "any" and "all" shall both mean "any and all".

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention in accordance with the present disclosure has been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

The disclosure is illustrated throughout the written description. It should be understood that numerous variations are possible while adhering to the inventive concept. Such variations are contemplated as being a part of the present disclosure.

The invention claimed is:

1. A method for preventing access to an electronic device while operating a vehicle, comprising the steps of:
providing a device housing system contained within a vehicle comprising, a front surface, a back surface, a first side member, having a first upper end and a first lower end, the first side member extending between the back surface and the front surface, a second side member, having a second upper end and a second lower end, the second side member extending between the back surface and the front surface, a top member, extending between the back surface and the front surface, and connected to the first upper end and the second upper end, a bottom member, extending between the back surface and the front surface, and connected to the first lower end and the second lower end, and a control module configured to communicate with a motion detection mechanism of the vehicle and with an internet-enabled device;
wherein the front surface, the first side member, the second side member, and the bottom member define a placement slot for the internet-enabled device, the placement slot being configured to support the internet-enabled device, and wherein the device housing system is configured to actuate the device housing system between a first position whereby physical access to the internet-enabled device is restricted and a second position whereby physical access to the internet-enabled device is permitted;
registering, by the user, the electronic device with the device housing system such that the electronic device and the device housing system are in wireless electronic communication;
disposing, by the user, the electronic device within the placement slot;
moving the device housing system into the first position resulting in the user being partially restricted from physically from accessing the electronic device;
performing, by the user, a verification protocol;
transmitting an unlock signal, from the console system to the vehicle, indicating that the electronic device is secured within the safe body; and
permitting driving operation of the vehicle, upon receipt of the signal;
wherein the verification protocol comprising the step of:
creating, by a remote server in wireless electronic communication with the electronic device, a verification code;
delivering the verification code to the electronic device;
entering, by the user into a software application on the electronic device, the verification code;
verifying, by the software application, and the entered verification code is accurate;
transmitting, by the software application via the electronic device, an authorization signal to the device housing system;
pressing the button, by the user, resulting in the device housing system being in the second position.

2. The method of claim 1, the verification protocol comprising the steps of:
creating, by a remote server in wireless electronic communication with the electronic device, a security query;
delivering the verification code to the electronic device;
entering, by the user into a software application on the electronic device, the security query;
responding to the security query, by the user interfacing with the software application;
verifying, by the software application that the security query was answered appropriately;
transmitting, by the software application via the electronic device, an authorization signal to the device housing system;
pressing the button, by the user, resulting in the device housing system being actuated to the second position.

3. The method of claim 2, wherein the security query is a puzzle to be solved by the user.

4. The method of claim 3, wherein the security query is one or more questions which must be answered audibly.

5. The method of claim 4, the software application being configured to analyze the user's audible answers and determine if the user's speech is slurred.

6. The method of claim 1, the device housing system further comprising a breathalyzer and the verification protocol comprising the steps of:
blowing into the breathalyzer by the user to provide the user's BAC;
determining whether the BAC is under 0.8;
transmitting, by the electronic device, an authorization signal to the safe body;
pressing the button, by the user, resulting in the safe body being in an open position.

7. The method of claim 1, the verification protocol comprising the steps of:
a. providing an image capture device in electronic communication with the device housing system;
b. presenting the user with one or more visual stimuli;
c. tracking, by the image capture device, eye movements of the user in relation to the one or more visual stimuli;
d. assessing, via the software application performing a horizontal gaze nystagmus test, whether the user is impaired.

8. The method of claim 1, the verification protocol comprising the steps of:
a. providing an image capture device in electronic communication with the device housing system;
b. presenting the user with one or more visual stimuli;
c. tracking, by the image capture device, eye movements of the user in relation to the one or more visual stimuli;
d. assessing, via the software application performing a psychomotor visual test, whether the user is impaired.

* * * * *